United States Patent [19]
Myers

[11] Patent Number: 6,024,272
[45] Date of Patent: *Feb. 15, 2000

[54] PRECISION ALIGNMENT DEVICE FOR TORQUE CONVERTER HUBS

[76] Inventor: John E. Myers, 14305 Mt. McClellan St., Reno, Nev. 89506

[*] Notice: This patent issued on a continued prosecution application filed under 37 CFR 1.53(d), and is subject to the twenty year patent term provisions of 35 U.S.C. 154(a)(2).

[21] Appl. No.: 08/871,806

[22] Filed: Jun. 9, 1997

[51] Int. Cl.⁷ .............................. B23K 37/00; B23K 1/14; B23K 5/22; B23Q 3/00
[52] U.S. Cl. .................. 228/44.3; 228/49.1; 228/212; 29/464
[58] Field of Search ................... 228/212, 44.3, 228/49.1, 2.3; 29/464, 281.1; 279/110

[56] References Cited

U.S. PATENT DOCUMENTS

| | | | |
|---|---|---|---|
| 3,088,746 | 5/1963 | Highberg et al. | 279/110 |
| 4,098,448 | 7/1978 | Sciaky et al. | 228/102 |
| 4,212,187 | 7/1980 | Scholz | 73/393 |
| 4,667,970 | 5/1987 | Pruden | 279/120 |
| 4,780,593 | 10/1988 | Kato | 219/125.1 |
| 4,788,857 | 12/1988 | Myers | 73/118.1 |
| 4,831,234 | 5/1989 | Myers | 219/125.11 |
| 5,000,366 | 3/1991 | Beattie | 228/6.1 |
| 5,333,500 | 8/1994 | O'Daniel | 73/468 |
| 5,499,755 | 3/1996 | Myers et al. | 228/44.3 |
| 5,511,895 | 4/1996 | Myers | 403/370 |
| 5,538,173 | 7/1996 | Hummel | 228/44.5 |
| 5,603,448 | 2/1997 | Woerner et al. | 228/114.5 |
| 5,749,339 | 5/1998 | Pearson et al. | 29/889.5 |
| 5,794,339 | 8/1998 | Pearson et al. | 29/889.5 |
| 5,902,498 | 5/1999 | Mistry et al. | 219/121.64 |

*Primary Examiner*—Patrick Ryan
*Assistant Examiner*—Kiley Stoner
*Attorney, Agent, or Firm*—Theodore J. Bielen, Jr.

[57] ABSTRACT

An alignment mechanism for replacement of a hub to a torque converter in order to weld the same utilizing a rotatable base member. A vice is employed and is supported by the base member. The vice has a plurality of jaws each including a multiplicity of flat surfaces. A particular flat surface of one particular jaw is co-planar with a flat surface of another jaw such that a torque converter impeller placed on the vice jaws would lie a plane. A shaft extends outwardly from the base member and lies on an axis that is perpendicular to any of the jaw flat surfaces or the planes formed by such flat surfaces. The shaft also passes through the hub and the torque converter impeller. The hub is held to the torque converter impeller when the welding process takes place.

7 Claims, 2 Drawing Sheets

6,024,272

PRECISION ALIGNMENT DEVICE FOR TORQUE CONVERTER HUBS

BACKGROUND OF THE INVENTION

The present invention relates to a novel and useful alignment mechanism for positioning of a replacement hub to a torque converter impeller for welding purposes.

Torque converters used in automobiles often require replacement of the hub portion which extends outwardly from the torque converter. The hub portion, which rides on a bushing, is damaged when the pump gears within the torque converter have worn out. In the past, a replacement torque converter has been installed in the automobile to correct this problem.

However, the impeller portions are generally reusable. Thus, replacement of a hub on the reusable impeller portion, or half, of a torque converter is a more efficient way of correcting a worn hub.

The typical replacement of the hub portion of a torque converter has proven to be difficult since the hub must be perfectly aligned along an axis which is perpendicular to the gear components found in a torque converter. Such alignment has often vexed mechanics attempting to perform this type of repair to a torque converter. In any case, the prior method of aligning a replacement hub with a reusable impeller portion of a torque converter was a tedious and painstaking process.

An alignment mechanism which quickly and easily positions a hub to a torque converter impeller for eventual welding of the hub to the torque converter impeller would be a notable advance in the automotive arts.

SUMMARY OF THE INVENTION

In accordance with the present invention a novel and useful alignment mechanism for positioning of a replacement hub to a torque converter impeller is herein provided.

The mechanism of the present invention utilizes a rotatable base member which is normally fastened to a platform that is leveled according to conventional methods. The rotatable member is turned by a motor during the welding process, which will be discussed hereinafter.

The mechanism of the present invention also utilizes a vice having a plurality of jaws which move inwardly and outwardly relative to a central axis. Each of the jaws includes a multiplicity of flat surfaces each of which lie in a plane. Also, a particular flat surface of a jaw would lie in the same plane as a particular flat surface of another jaw of the vice. In this manner, the bottom portion of a torque converter impeller will lie perfectly flat on the co-planer surfaces of the plurality of jaws. Also, since the base member is level, a plane formed by flat surfaces of a plurality of jaws and the torque converter impeller lie essentially in a horizontal plane. Of course, the bottom flange of a reusable torque converter impeller must be ground or machined to have a flat surface.

A shaft extending along the central axis of the vice is supported by the base member to lie perpendicular to any of the jaw flat surfaces and any of the planes formed by multiple surfaces of the plurality of jaws. The shaft is intended to pass through the replacement hub and the torque converter impeller. The hub passing over the shaft is then essentially fixed perpendicular to the torque converter base surface and the top welding surface in order to allow welding of the same in such alignment. Means is provided for holding the hub to the torque converter impeller in this position prior to the welding. After the welding has been completed, the hub has been aligned with an axis that is perpendicular to the internal rotatable components of the torque converter impeller. Consequently, the refurbished torque converter having a replacement hub does not cause any subsequent wearing of the pump gears of the torque converter or permit any vibration in the vehicle when such refurbished torque converter is installed in a vehicle.

It may be apparent that a novel and useful alignment mechanism for replacement of the hub of a torque converter has been hereinbefore described.

It is therefore an object of the present invention to provide an alignment mechanism for replacement of a new hub on an old torque converter impeller which permits welding of the hub to the torque converter impeller in near perfect alignment.

Another object of the present invention is to provide an alignment mechanism for replacement of the hub of a torque converter impeller that allows such alignment through a quick and effortless process.

Yet another object of the present invention is to provide an alignment mechanism for replacement of the hub on a torque converter impeller which is capable of adjusting to torque converter impellers and hubs of different sizes and configurations.

Another object of the present invention is to provide an alignment mechanism for placement of a hub to a torque converter impeller that requires a minimum of labor to accomplish such task.

The mechanism of the present invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the hereinabove described drawings.

Figure 1:
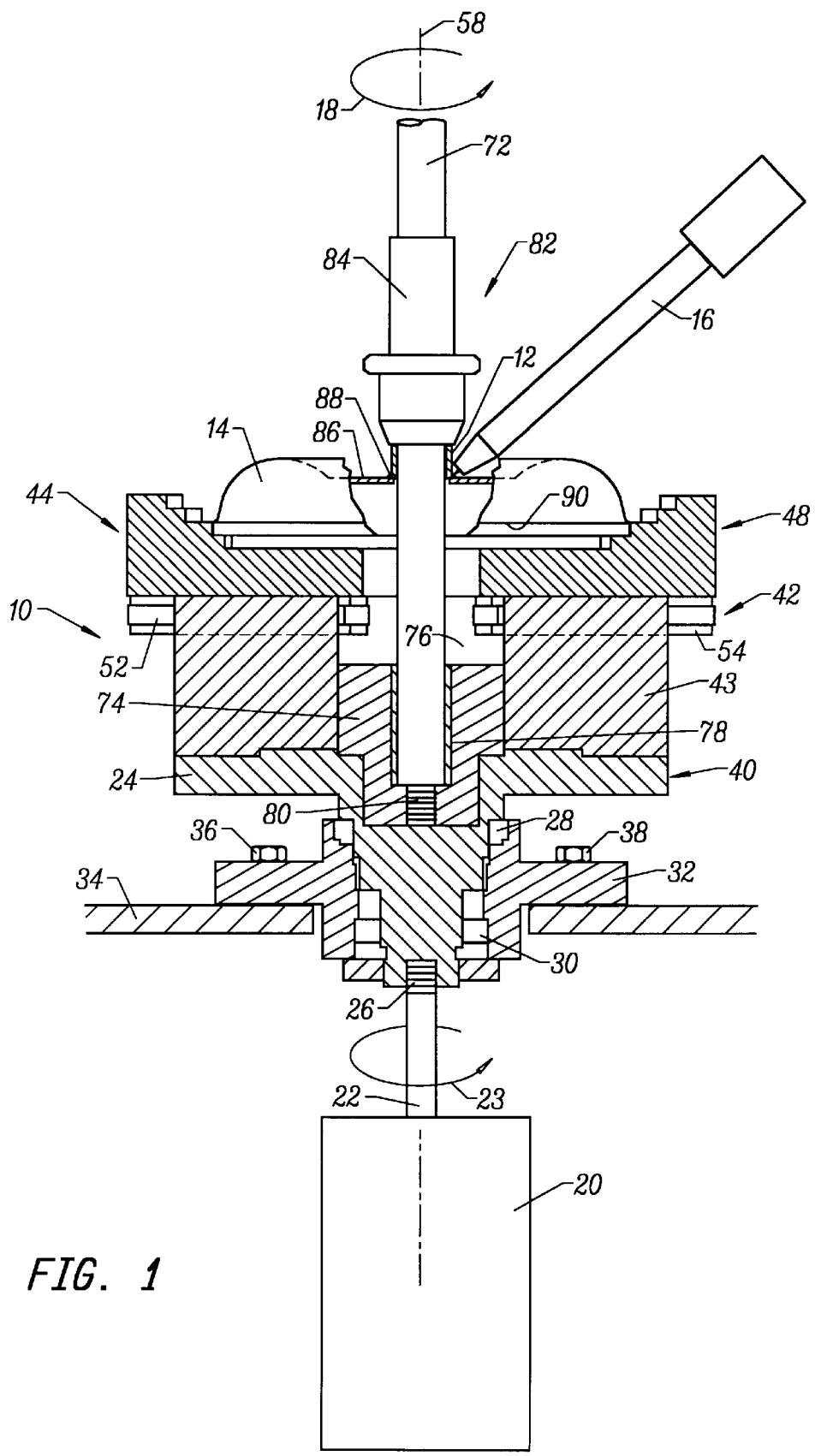
FIG. 1 is an axial sectional view of the alignment mechanism of the present invention depicting the welding apparatus and a torque converter impeller in place relative to a replacement hub.

The invention as a whole is shown in the drawings by reference character 10. The alignment mechanism 10 is intended to fix or place a replacement hub 12 to the impeller portion 14 of a torque converter. Generally, the hub 12 is a new part while the torque converter impeller 14 constitutes a reusable part from the torque converter which has been disassembled in part. A welding mechanism 16 of conventional configuration is generally used to weld the hub 12 to torque converter impeller 14 as these two components are rotated according to directional arrow 18, FIG. 1. Motor means 20 includes an output shaft 22 which turns according to directed arrow 23.

Spindle turntable 24 is threaded to threaded end 26 of shaft 22 and, thus, turns with shaft 22. Spindle turntable 24 is supported by tapered bearings 28 and 30 which rest on spindle housing 32. Spindle housing 32 is fastened to a level table surface 34 by the use of bolts 36 and 38. Thus, spindle turntable serves as a rotatable base member 40 for mechanism 10.

Figure 2:
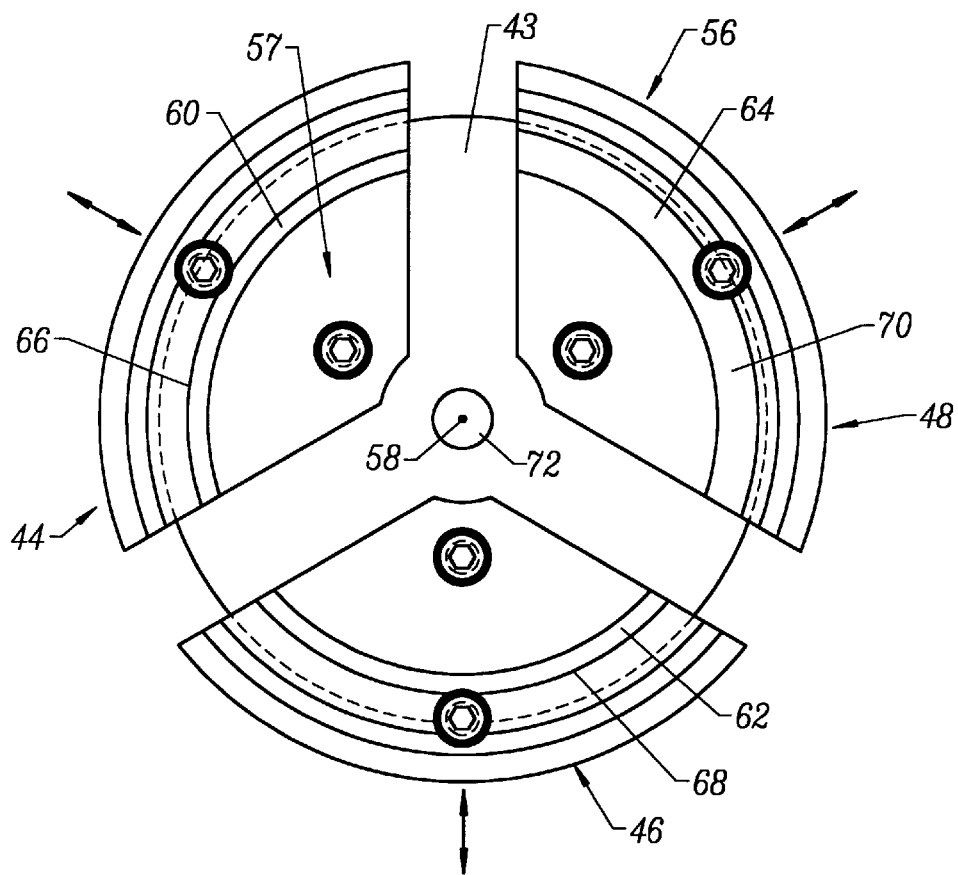
FIG. 2 is a top plan view of the mechanism of the present invention without the hub, torque converter impeller, and welding apparatus.
Figure 3:
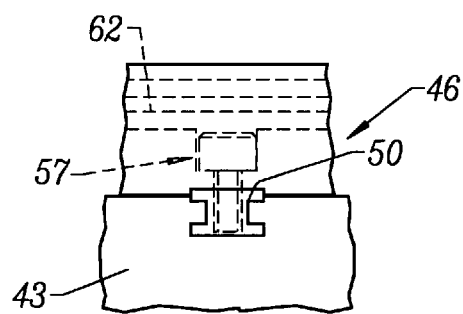
FIG. 3 is a partial side elevational view of a single jaw of the vice used in conjunction with the present invention.

A vice 42 is also found in the present invention. Vice 42 includes a bottom portion 43 which sits atop spindle turntable 24 and turns with the same. Vice 42 includes a trio of jaws 44, 46, and 48, FIG. 2. Jaws 44, 46, and 48 slide along tracks such as tracks 50, 52, and 54, FIGS. 1 and 3. Fasteners 57 hold jaws 44, 46, and 48 to tracks 50, 52, and 54. For example, bottom portion 43 and tracks 50, 52, and 54 may be of the type available under the designation Zero-Set manufactured by B.T.C. of Kalamazoo, Mich.

Vice jaws 44, 46, and 48 possessing a multiplicity of flat surfaces which are concentric about central axis 58 that lies at the center of vice 42. That is to say, a particular flat surface on jaw 44 is co-planar with a particular flat surface on jaw 46 and jaw 48. As an example, flat surface 60 of jaw 44 lies in the same plane as flat surface 62 and flat surface 64 of jaws 46 and 48, respectively. Thus, a series of planes are formed by corresponding flat surfaces on jaws 44, 46, and 48 which extend upwardly from motor 20. As may be observed from the drawings, FIGS. 1 and 2, the multiplicity of flat surfaces 56 form a series of planes that extend or step upwardly from motor 20. The expanse between corresponding flat surfaces widen as one travels upwardly from motor 20. The purpose of such disparity is to accommodate torque converter impellers of different diameters. As jaws 44, 46, and 48, are able to slide in and out relative to axis 58, wall portions 66, 68, and 70 press firmly against a torque converter impeller 14 lying in the plane formed by exemplary flat surfaces 60, 62, and 64.

Shaft 72 is also found in the present invention and is constructed in the form of a cylindrical member. Shaft 72 lies concentrically with axis 58, which is essentially perpendicular to any of the planes formed by corresponding multiplicity of flat surfaces of jaws 44, 46, and 48. To provide such accurate alignment of shaft 72, retainer 74 is employed and lies within the central void 76 formed by bottom portion 43 of base member 40. Bushing 78 assures a snug fit of shaft 72 within retainer 74. Moreover, threaded end portion 80 of shaft 72 threadingly engages retainer 74.

Means 82 is also found in the present invention to hold torque converter impeller 14 to hub 12 on shaft 72. Means 82 may take the form of a collet 84 of the type depicted in U.S. Pat. No. 5,511,895, which is incorporated by reference hereto in its entirety.

In operation, the user places torque converter impeller 14 bottom surface 90 on any of the three corresponding surfaces of multiplicity of flat surfaces 56 of jaws 46, 48, and 50. Bottom surface 90 has been ground to lie parallel to the internal component of impeller 14. Jaws 44, 46, and 48 are then tightened inwardly to hold torque converter impeller 14 against exemplary walls 66, 68, and 70 of flat surfaces 60, 62, and 64. Of course, any of the other corresponding flat surfaces may be employed in this regard. Torque converter impeller 14 fits over shaft 72, as does hub 12, which generally is a new component. Annular planar surface 86 of torque converter impeller 14 then lies directly against hub 12. Collet 84 is slipped over shaft 72 and is tightened to hold hub 12 snugly against annular planar surface 86 of torque converter impeller 14. Of course, table 34 has been leveled so that annular planar surface 86 of torque converter 14 is essentially horizontal. Shaft 72 assures that the center of torque converter impeller 14 is also aligned with central axis 58, which passes through shaft 72. Motor 20 is then activated to turn output shaft 22 according to directional arrow 23. At this point, turntable spindle, 24, base member 40, vice 44, shaft 72, and torque converter 14 rotate according to directional arrow 18. Welding apparatus, which may be an automatic welder, then welds hub 12 to torque converter impeller 14 by producing an endless bead 88 about the base of hub 12. After welding, collet 84 is removed, jaws 44, 46, and 48 are slackened, and torque converter impeller 14 is lifted upwardly and away from shaft 72 for assembly with the remaining portions a torque converter.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. An alignment mechanism for placement of a hub to a torque converter impeller, to permit welding of the hub to the torque converter impeller comprising;

a. a base member;
   b. a vice having at least a first jaw and a second jaw, said first and second jaws each including at least a first flat surface lying in a first plane and a second flat surface lying in a second plane, said first flat surface of said first jaw being coplannar with said first flat surface of said second jaw, said second flat surface of said first jaw being coplannar with said second flat surface of said second jaw, said first surface of said second jaw, said first plane of said first jaw positioned parallel to said second plane of said first jaw, said base member supporting said vice;
   c. a shaft, said shaft extending along an axis, said axis lying perpendicular to any of said vice flat surface planes, said shaft passing through the hub and torque converter impeller, said shaft being supported by said base member;
   d. means for holding the hub to the torque converter impeller; and
   e. means for rotating the hub held to the torque converter impeller.

2. The mechanism of claim 1 in which said at least first and second jaws of said vice comprises a trio of jaws.

3. The mechanism of claim 1 in which each of said flat surfaces of said first and second jaws are concentric to said shaft axis.

4. The mechanism of claim 1 in which each of said flat surfaces of said first and second jaws lie in a horizontal plane.

5. The mechanism of claim 4 in which said first flat surface of said first jaw lies outwardly from said second flat surface of said first jaw relative to said base member.

6. The mechanism of claim 5 in which said first and second flat surfaces of said first jaw form a series of steps extending outwardly from said base member.

7. The mechanism of claim 1 which said base member includes a spindle turntable attached to said shaft and said vice, and said means for rotating the hub held to the torque converter impeller comprises means for rotating said spindle turntable.

* * * * *